Feb. 21, 1967 MASAHARU NISHIMURA 3,304,793
TRANSMISSION WITH BI-DIRECTIONAL CLUTCHING MECHANISM
Filed June 16, 1964 2 Sheets-Sheet 1
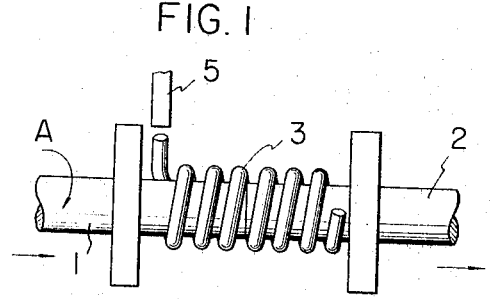
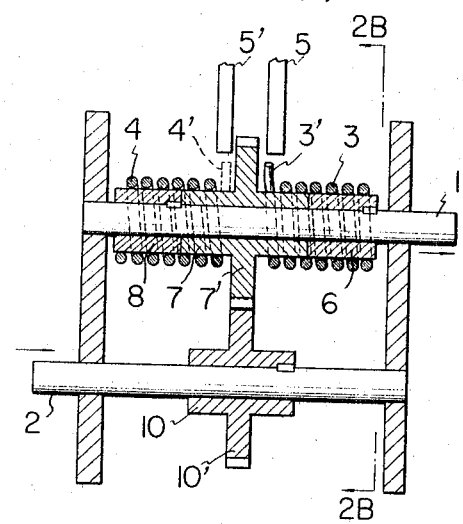
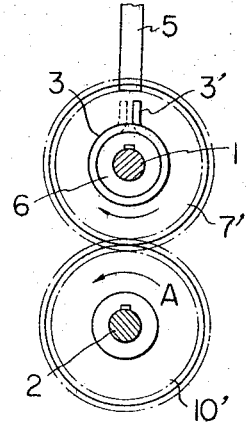
INVENTOR.
Masaharu Nishimura
BY
Meston & Meston

United States Patent Office 3,304,793
Patented Feb. 21, 1967

3,304,793
TRANSMISSION WITH BI-DIRECTIONAL CLUTCHING MECHANISM
Masaharu Nishimura, Kodaira-shi, Japan, assignor to Kabushiki Kaisha Hitachi Seisakusho, Tokyo-to, Japan, a joint-stock company of Japan
Filed June 16, 1964, Ser. No. 375,550
Claims priority, application Japan, June 18, 1963, 38/30,834
6 Claims. (Cl. 74—368)

This invention relates to mechanical clutches, particularly to helical spring type friction clutches. More specifically, the invention concerns a new universal clutch which is capable of transmitting both forward and reverse rotation, and in which helical springs are utilized.

Heretofore, helical spring clutches of the type designed to transmit rotation between two shafts through utilization of frictional force between a helical spring and the shafts could be used for transmission of rotation only in one direction, as will be hereinafter described more fully.

It is a principal object of the present invention to provide a universal clutch of the above described type which, by a simple mechanism, is rendered capable of transmitting rotation in two opposite directions.

The nature, principle, and details of the invention, as well as other objects and advantages thereof, will be best understood by reference to the following description when taken in conjunction with the accompanying drawings in which like parts are designated by like reference characters, and in which:

FIGURE 1 is a side elevational view showing a helical spring clutch mechanism of conventional design;

FIGURE 2(a) is a side elevational view, in vertical longitudinal section, showing a first embodiment of the universal clutch mechanism according to the invention;

FIGURE 2(b) is an elevational view in cross section taken along the plane indicated by line 2B—2B in FIGURE 2(a) as viewed in the arrow direction thereof;

Figure 3A:
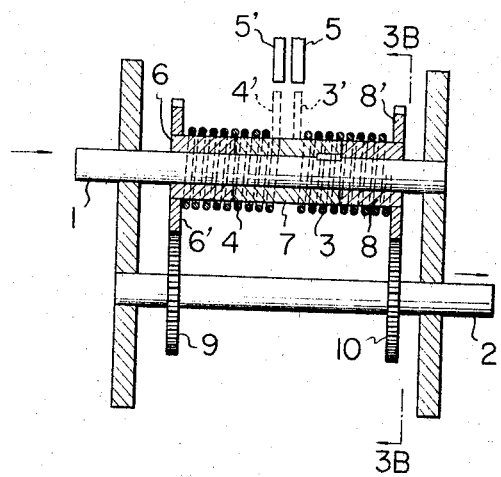
Figure 3B:
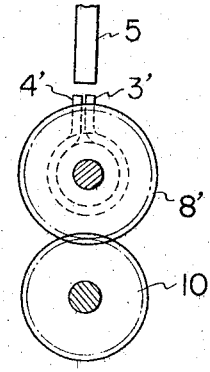
Figure 4A:
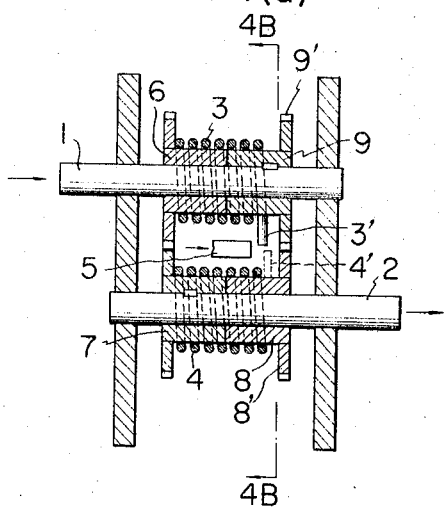
Figure 4B:
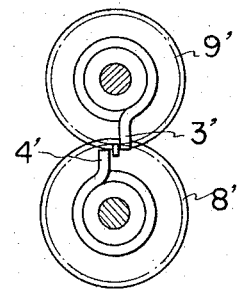

FIGURES 3(a) and 3(b) are views respectively similar to FIGURES 2(a) and 2(b) showing a second embodiment of the invention; and FIGURES 4(a) and 4(b) are views respectively similar to FIGURES 2(a) and 2(b) showing a third embodiment of the invention.

Referring to FIGURE 1, the example of the aforementioned helical spring clutch of conventional design shown therein essentially comprises an input shaft (or drive shaft) 1, an output shaft (or driven shaft) 2 disposed in coaxial and closely opposed relationship to the input shaft 1, and a helical spring 3 firmly fitted around the opposed ends of both shafts 1 and 2. In the case when the helical spring 3 is in the form of a left-handed helix as shown, a clockwise rotation of the input shaft 1 as viewed axially from the left in FIGURE 1, as indicated by the arrow A, will cause the spring 3 to grip, tightly with great force, both shaft ends thereby to create a large frictional resistance to slippage between the spring and the shafts, whereby the torque of the input shaft is transmitted to the output shaft 2. However, if the input shaft rotates counter-clockwisely, the spring will assume a slightly unwound state, whereby the frictional clutching force will be removed, and the input shaft will merely undergo freewheeling rotation. Accordingly, the mechanism cannot function as a clutch for reverse rotation.

The present invention contemplates overcoming this inadequacy by providing a simple mechanism in which a group of collars provided between two parallel shafts are coupled by a combination essentially of springs and gears, and by which torque in two rotational directions can be transmitted.

The specific nature of the invention, as well as its other objects and advantages, will be more fully apparent from the following description with respect to preferred embodiments of the invention.

In the first embodiment of the invention as shown in FIGURE 2, a first shaft 1 and a second shaft 2 are to be coupled and are here considered to be output and input shafts, respectively. A collar 7 which is freely rotatable about the first shaft 1 and is integrally fixed to a gear 7' is coupled to the second shaft 2 by the gear 7' and a gear 10' meshed therewith and fixed to the second shaft 2. Alternatively, in place of these gears, a belt drive mechanism with pulleys may be used, the torque of the second shaft 2 being transmitted directly to the collar 7.

Adjacently on the left and right (as viewed in FIGURE 2(a)) of the collar 7, there are provided coaxial collars 8 and 6 having outer diameters equal to that of the collar 7 and fixed to the first shaft 1. That is, the clutch transmission of the rotations of the first and second shafts is designed to take place between the collar 7 and the collars 6 and 8. For this purpose, the mutually adjacent collar 6 and the right-hand side of the collar 7 and the mutually adjacent collar 8 and the left-hand side of the collar 7 are respectively provided with helical springs 3 and 4 fitted firmly onto the cylindrical outer parts of the collars.

The helical winding directions of the two springs are the same, and the inner diameter of each spring in the free state is made less than the outer diameter of the collars. The winding ends of the two springs on the input side (the sides encompassing the collar 7) are provided with outwardly bent catch or hook parts 3' and 4' as shown in FIGURE 2.

If the helical winding direction of the springs is clockwise as viewed axially toward the winding advance, that is, if the helix is a right-handed helix, and if the rotation of the input shaft 2 is in the direction of the arrow A, one of springs 3 will grip its collars tightly, and the other spring 4 will assume a loose, slightly unwound state, whereby the rotation will be transmitted through the collars 7 and 6 to the output shaft 1. On the other hand, if the rotational direction of the input shaft 2 is opposite to the A direction, the helical spring 4 will similarly operate to transmit the input rotation through collars 7 and 8, whereby the rotation is transmitted to the output shaft.

In the case when the rotation of the input shaft is not to be transmitted, an actuator 5 or 5' is caused to contact and press against the hook part 3' or 4' of the effective helical spring, thereby to cause said spring to become loose and permit the input side collar 7 to freewheel, whereby the torque transmission is cut off.

While, in the above description, the second shaft 2 and the first shaft 1 are considered as being the input and output shafts of the mechanism, it is also possible, according to the same principle, to obtain clutching action by using the first shaft 1 as the input shaft and the second shaft 2 as the output shaft. In this case, however, it is necessary to form the hook parts 3' and 4' of the helical springs on the input sides of the springs, that is, at the winding ends of the springs on their sides of the collars 6 and 8, respectively. Accordingly, it is necessary to provide the actuators 5 and 5' in respective positions confronting the hook parts.

A second embodiment of the universal clutch mechanism according to the invention is shown in FIGURES 3(a) and 3(b). This embodiment differs from that of the first embodiment of the invention in that the relationships between the collars and the shafts are reversed.

That is, there are provided two collars 6 and 8 which rotate freely about a first shaft 1 and are respectively coupled by gears (6', 9 and 8', 10) to a second shaft 2 and which are disposed coaxially on opposite sides of a collar 7 fixed to the first shaft 1. In this case, therefore, two gear or belt drive mechanisms coupling free collars on the first shaft 1 to the second shaft are provided at two places. In other respects, that is, the use of coaxial collars of the same diameter, two helical springs of the same helical winding direction, and two actuators at two positions, this mechanism shown in FIGURE 3, is the same as those of the first embodiment of the invention. In this second mechanism embodying the invention, also, it is possible to carry out operation with mutually interchanged input and output shafts. In the embodiment of FIG. 3, the springs 3 and 4 may be unified and only one operating shaft may be used.

A third embodiment of the universal clutch mechanism according to the invention is shown in FIGURES 4(a) and 4(b). This mechanism differs from that of the first embodiment of the invention in that a collar disposed about the midspan part of each of the first and second shafts is divided into two collars, whereby two groups of collars, each group consisting of two collars on one shaft, are provided. More specifically, a collar 6 rotating freely about the first shaft 1 is coupled by means such as gears to a collar 7 fixed to the second shaft 2, and a collar 8 rotating freely about the second shaft 2, in close proximity and adjacent to the collar 7 is coupled by means such as gears to a collar 9 fixed to the first shaft 1 in close proximity and adjacent to the collar 6, adjacent collars on each shaft being coupled by a helical spring.

The use of adjacent collars of the same diameter, the springs, and the actuator are the same as those in the first example shown in FIGURE 2. In the case of this third example, it is convenient to dispose the actuator 5 in a position equidistant from the two hook parts 3' and 4' of the springs 3 and 4. A single, common actuator may be used to actuate both hook parts. In this case, also, it is possible to carry out operation with mutually interchanged input and output shafts.

As described above in detail with respect to embodiments, the universal clutch mechanism of this invention is made, with simple means, capable of transmitting torque in two opposite rotational directions, which two-directional transmission could not be accomplished heretofore by conventional spring clutch mechanisms. Furthermore, in the clutch mechanism of this invention, the input and output shafts can be mutually interchanged by changing the directions of the helical springs and the position of the actuator.

In addition, this clutch mechanism can be utilized for changing speed, torque, or rotational angle by employing suitable ratios of the diameters of the gears or pulleys. The mechanism of this invention has a further advantage in the case and speed with which the springs, constituting the clutching members, can be engaged and disengaged by means of the actuators, whereby the mechanism is highly effective for use in a wide range of applications such as control devices.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. In a transmission having a clutch mechanism for coupling first and second parallel rotary drive shafts, the combination of parts constituting a universal clutch mechanism and consisting of said first and second shafts being cylindrical and devoid of any taper; three equidiameter annular collars, devoid of tapers and disposed closely and coaxially about the first shaft, the outer two collars being fixed to said shaft and the inside collar being free to rotate about said shaft; means for transmitting rotation from the second shaft to said inside collar; two like helical clutching spring with their windings facing in the same direction, each fitted firmly about one of said outer collars and the end part nearest thereto of the inside collar, at least one end of said springs being adapted to be controllably actuated to vary the clutching force of said springs; and outside actuating means for said springs.

2. The universal clutch mechanism according to claim 1, wherein said means to transmit rotation from the second shaft to said inside collar comprises a gear mechanism.

3. In a transmission having a clutch mechanism for coupling first and second parallel rotary drive shafts, the combination of parts constituting a universal clutch mechanism and consisting of said first and second shafts being cylindrical and devoid of any taper; three equidiameter annular collars, devoid of tapers and disposed closely and coaxially about the first shaft, the outer two collars being free to rotate about the first shaft and the inside collar being fixed to said shaft; means for transmitting rotation from the second shaft to said outer two collars; two like helical clutching springs with their windings facing in the same direction, each fitted firmly about one of said outer collars and the end part nearest thereto of the inside collar, at least one end of said springs being adapted to be controllably actuated to vary the clutching force of said springs; and outside actuating means for said springs.

4. The universal clutch mechanism according to claim 3, wherein the means to transmit rotation from the second shaft to said outer two collars comprises a gear mechanism.

5. In a transmission having a clutch mechanism for coupling first and second parallel rotary drive shafts, the combination of parts constituting a universal clutch mechanism and consisting of said first and second shafts being cylindrical and devoid of any taper; two equidiameter annular collars, devoid of tapers and disposed closely and coaxially about each said first and second shaft, respectively, one of said collars being free to rotate about its shaft and the other being fixed to its shaft; means for transmitting rotation between the free collar of each shaft to the fixed collar of the other shaft; two like helical clutching springs with their windings facing in the same direction, each fitted firmly about the adjacent end parts of the two collars on one shaft; at least one end of said springs being adapted to be controllably actuated to vary the clutching force of said springs; and outside actuating means for said springs.

6. The universal clutch mechanism according to claim 5, wherein the means to transmit rotation between the free collar of each shaft to the fixed collar of the other shaft comprises a gear mechanism.

References Cited by the Examiner

UNITED STATES PATENTS

| | | | |
|---|---|---|---|
| 2,609,702 | 9/1952 | Rogers | 74—368 |
| 2,622,450 | 12/1952 | Gorske et al. | 74—368 |
| 2,742,126 | 4/1956 | Morton | 192—41 |
| 2,881,640 | 4/1959 | Chambers | 74—368 X |
| 2,885,896 | 5/1959 | Hungerford et al. | 192—81 X |
| 2,939,329 | 6/1960 | Doerries | 192—51 |
| 2,975,648 | 3/1961 | Doerries | 74—377 |
| 3,090,248 | 5/1963 | Kurtz | 74—368 |

DAVID J. WILLIAMOWSKY, *Primary Examiner.*

L. GERIN, *Assistant Examiner.*